(12) United States Patent
Rabovitser et al.

(10) Patent No.: US 6,572,912 B1
(45) Date of Patent: Jun. 3, 2003

(54) COOKING PROCESS

(75) Inventors: Joseph K. Rabovitser, Skokie, IL (US); Sandeep Ahuja, Florence, SC (US); Mark J. Khinkis, Morton Grove, IL (US); Robert Hanson, Madison, WI (US); William Cummings, Indianapolis, IN (US); Daren Cornforth, Providence, UT (US)

(73) Assignee: Institute of Gas Technology, Des Plaines, IL (US)

( * ) Notice: Subject to any disclaimer, the term of this patent is extended or adjusted under 35 U.S.C. 154(b) by 0 days.

(21) Appl. No.: 09/553,445

(22) Filed: Apr. 19, 2000

Related U.S. Application Data

(63) Continuation-in-part of application No. 09/223,628, filed on Dec. 30, 1998, now abandoned.

(51) Int. Cl.[7] .................................................. A23C 3/00
(52) U.S. Cl. ....................... 426/523; 426/315
(58) Field of Search ................. 426/523, 641, 426/315; 99/337, 328, 385, 473, 482; 432/222, 351, 223, 350, 47, 144; 126/21 A, 19 R, 21 R, 136 R, 136 C, 120; 431/175, 177, 173, 284, 285, 174

(56) References Cited

U.S. PATENT DOCUMENTS

| | | | |
|---|---|---|---|
| 3,630,499 A | 12/1971 | Kramer, Jr. | |
| 4,610,625 A | 9/1986 | Bunn | |
| 4,929,541 A | 5/1990 | Potter et al. | |
| 4,993,944 A | 2/1991 | Potter et al. | |
| 5,083,918 A | 1/1992 | Potter et al. | |
| 5,220,888 A | 6/1993 | Khinkis et al. | |
| 5,340,305 A | * 8/1994 | Joyce | ............ 431/7 |
| 5,399,086 A | 3/1995 | Potter et al. | |
| 5,441,403 A | 8/1995 | Tanaka et al. | |
| 5,443,852 A | 8/1995 | Shahidi et al. | |
| 5,655,511 A | 8/1997 | Prabhu et al. | |

\* cited by examiner

*Primary Examiner*—Nina Bhat
(74) *Attorney, Agent, or Firm*—Mark E. Fejer

(57) ABSTRACT

A process and apparatus for cooking non-cured food products in which the non-cured food products are heated in an atmosphere comprising less than about 0.5 vppmd of $NO_2$, producing a cooked food product having substantially no pink discoloration on its outer surface.

4 Claims, 1 Drawing Sheet

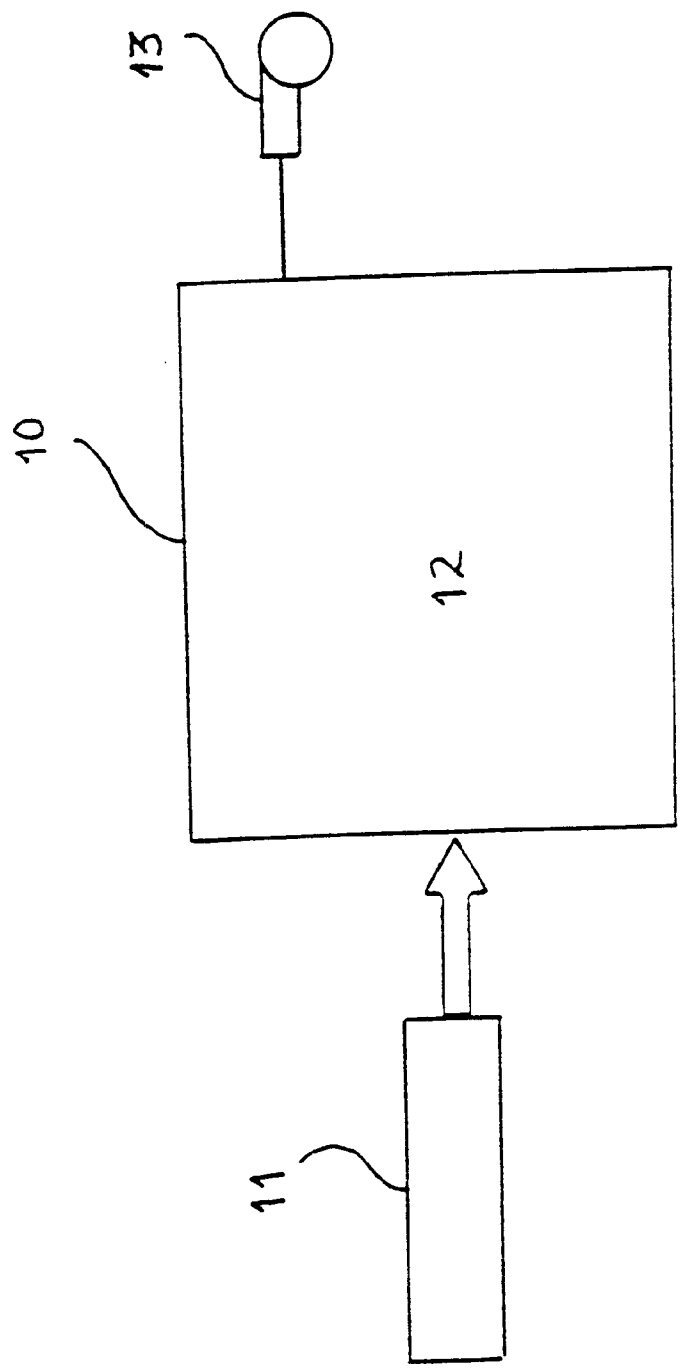

COOKING PROCESS

This application is a continuation-in-part application of a co-pending U.S. patent application having Ser. No. 09/223,628 filed Dec. 30, 1998 now abandoned.

BACKGROUND OF THE INVENTION

1. Field of the Invention

This invention relates to a process and apparatus for cooking non-cured food products, including meat, poultry and fish, using direct-fired burners in a manner which prevents pink discoloration.

2. Description of Prior Art

When direct-fired burners are used for cooking non-cured meat, poultry, or fish products, a pink discoloration or ring is generally observed on the outer edges of the product being cooked. This pink discoloration is often objectionable to the consumer because it suggests that the meat, poultry, or fish is undercooked or contaminated. This pink color is only objectionable in non-cured meat, poultry, or fish products, and is not objectionable in cured meat or poultry such as ham, turkey, bacon, and corned beef in which the pink "cured" color is intentionally created by adding sodium nitrite to the product mixture during processing. The sodium nitrite creates a chemical reaction which cures the product and turns the entire cross-section of the cooked product a pink color. This cured pink color is characteristic of all cooked and cured meat, poultry, and fish products. U.S. Pat. No. 5,443,852 teaches a proteinaceous food product containing stabilized cooked cured-meat pigment as a substitute for the use of nitrites to produce a product having the typical pink color of a nitrite-cured product.

The common belief is that in non-cured meat, poultry, and fish products, the primary cause of the pink discoloration is either nitric oxide (NO), or carbon monoxide (CO), or both, from the exhaust of direct-fired burners. It is believed that these gases are absorbed into the surface of the non-cured product, that they then combine with the product pigments and, when heated, form the pink discoloration. We have determined, through experimentation on an industrial forced air convection oven with direct-fired natural gas burners that neither NO nor CO are the cause of the pink discoloration. Rather, we have found that nitrogen dioxide ($NO_2$) from the direct-fired burner is the only cause of this pink discoloration. Accordingly, by controlling the level of $NO_2$ in the atmosphere in which the non-cured meat, poultry, or fish product is cooked, we can eliminate the pink discoloration. It should also be noted that other forms of $NO_x$ do not appear to contribute to the formation of pink discoloration during the cooking process.

SUMMARY OF THE INVENTION

Accordingly, it is an object of this invention to provide a process for cooking non-cured food products including non-cured meat, poultry, or fish products in a manner which does not produce the pink discoloration which is so objectionable to consumers.

It is another object of this invention to provide an apparatus suitable for carrying out the cooking process by which the formation of pink discoloration is eliminated during the cooking of non-cured food products.

These and other objects of this invention are achieved by a process for cooking non-cured food products, typically meat, poultry, fish and combinations thereof comprising heating the non-cured food products in a direct-fired oven and generating and maintaining an atmosphere in said direct-fired oven comprising less than about 0.5 volumetric parts per million dry (vppmd) of $NO_2$. We have found that maintaining the level of $NO_2$ in the direct-fired oven below about 0.5 vppmd prevents the formation of pink discoloration during cooking in non-cured food products.

An apparatus for cooking non-cured food products such as meat, poultry, fish and combinations thereof in accordance with this invention comprises a heating chamber, direct-fired means for heating the interior of the heating chamber, said direct-fired means in communication with the heating chamber, and atmosphere control means for producing and maintaining an atmosphere comprising less than about 0.5 vppmd of $NO_2$ in the heating chamber.

In accordance with one preferred embodiment of this invention, the atmosphere control means comprises a direct-fired burner, the combustion from which produces less than about 0.5 vppmd of $NO_2$. In accordance with another embodiment of this invention, the atmosphere control means comprises dilution means for diluting the products of combustion from said direct-fired burner, thereby reducing the concentration of $NO_2$ in the heating chamber.

BRIEF DESCRIPTION OF THE DRAWING

These and other objects and features of this invention will be better understood from the following detailed description taken in conjunction with the drawing wherein:

FIG. 1 is a schematic diagram of an apparatus in accordance with one embodiment of this invention.

DESCRIPTION OF PREFERRED EMBODIMENTS

As previously stated, we have discovered that the only cause of pink discoloration from cooking of non-cured meat, poultry, and fish products in a direct-fired oven is the presence of nitrogen dioxide ($NO_2$) in the atmosphere surrounding the food product. We have further discovered that in order to prevent the formation of the pink discoloration, the level of $NO_2$ in the atmosphere surrounding the food product must be maintained below about 0.5 vppmd. Accordingly, the process of this invention is simply the heating of the non-cured food product in a direct-fired heating apparatus, the atmosphere in which comprises less than about 0.5 vppmd of $NO_2$.

So long as the amount of $NO_2$ in the atmosphere surrounding the cooking food product is less than about 0.5 vppmd, the remaining parameters associated with cooking of these food products do not appear to affect the results of the process of this invention. Thus, the process of this invention is operable at any temperature suitable for heating non-cured food products to a cooked temperature. Similarly, the process of this invention is not affected by humidity in the atmosphere. Thus, the process of this invention may be operated in the humidity range of 0–100%.

The cooking process of this invention is not affected by cooking time, nor is it affected by changes in cooking temperature. That is, variable temperature cooking processes in which temperatures increase or decrease during the cooking procedure may successfully employ the process of this invention.

The process of this invention is carried out in a heating apparatus in accordance with one embodiment of this invention as shown in FIG. 1. The heating apparatus comprises a heating chamber 10, direct-fired means 11 for heating the interior 12 of the heating chamber 10 in communication with said heating chamber 10, and atmosphere control means for producing and maintaining an atmosphere comprising less than about 0.5 vppmd of $NO_2$ in the heating chamber. In accordance with one preferred embodiment of this invention, direct-fired means 11 comprises a direct-fired burner. The direct-fired burner is preferably a gaseous fuel-fired burner for which the preferred gaseous fule is natural gas. In accordance with one preferred embodiment of this invention, the atmosphere control means comprises a direct-fired burner, the combustion from which produces less than about 0.5 vppmd of $NO_2$. U.S. Pat. No. 5,220,888 teaches an ultra-low $NO_x$, two-stage cyclonic combustor or burner. We have found that this burner is suitable for use with an oven in which non-cured food is cooked in accordance with the process of this invention. Numerous other low-$NO_x$ burner devices are known (see, for example, U.S. Pat. Nos. 5,441,403; 5,399,086; 4,610,625; 3,630,499; 4,929,541; 5,083,918; and 4,993,944); however, only those burners which produce less than about 0.5 vppmd of $NO_2$ are suitable atmosphere control means for use in the apparatus of this invention.

In accordance with another embodiment of this invention, the atmosphere control means comprises dilution means for diluting the products of combustion from the direct-fired burner. Such dilution means, in accordance with one embodiment of this invention, comprises a blower 13 for introducing air into the heating apparatus. In accordance with another embodiment of this invention, the dilution means comprises a direct-fired burner which is fired using more than the stoichiometric requirement of combustion air for complete combustion of the fuel, that is under fuel-lean conditions.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for cooking non-cured food products selected from the group consisting of meat, poultry, fish and combinations thereof comprising:

heating said non-cured food products in a direct-fired oven; and generating and maintaining an atmosphere comprising less than 0.5 vppmd of $NO_2$ in said direct-fired oven, producing cooked food products having substantially no pink discoloration on its surface.

2. A process in accordance with claim 1, wherein heat for said heating of said non-cured food products is produced by a gaseous fuel-fired burner firing into said direct-fired oven.

3. A process in accordance with claim 2, wherein said gaseous fuel-fired burner is fired with natural gas.

4. A process in accordance with claim 1, wherein said atmosphere is generated by a direct-fired burner which produces combustion products comprising less than 0.5 vppmd of $NO_x$.

\* \* \* \* \*